No. 730,820. PATENTED JUNE 9, 1903.
W. P. GRATH.
CONTINUOUS KILN.
APPLICATION FILED DEC. 5, 1902.
NO MODEL. 3 SHEETS—SHEET 1.

No. 730,820. PATENTED JUNE 9, 1903.
W. P. GRATH.
CONTINUOUS KILN.
APPLICATION FILED DEC. 5, 1902.
NO MODEL. 3 SHEETS—SHEET 2.

Attest:
Edw. L. Dillow
J. B. Megown

Inventor:
W. P. Grath,
by
Carr & Carr
Att'ys

No. 730,820. PATENTED JUNE 9, 1903.
W. P. GRATH.
CONTINUOUS KILN.
APPLICATION FILED DEC. 5, 1902.
NO MODEL. 3 SHEETS—SHEET 3.

Attest:
Edw. L. Dillow
J. B. Megown.

Inventor:
W. P. Grath,
by Carr & Carr,
Att'ys.

No. 730,820.

Patented June 9, 1903.

UNITED STATES PATENT OFFICE.

WALTER P. GRATH, OF ST. LOUIS, MISSOURI.

CONTINUOUS KILN.

SPECIFICATION forming part of Letters Patent No. 730,820, dated June 9, 1903.

Application filed December 5, 1902. Serial No. 134,005. (No model.)

*To all whom it may concern:*

Be it known that I, WALTER P. GRATH, a citizen of the United States, and a resident of the city of St. Louis and State of Missouri, have invented a new and useful Continuous Kiln, of which the following is a specification.

My invention relates to continuous-kilns, and has for its principal objects to utilize the waste heat from one chamber for the water-smoking and initial heating of another chamber and to secure a uniform distribution of the heat throughout each chamber.

To these ends my invention consists in the arrangements and constructions of parts hereinafter described and claimed.

Figure 1:
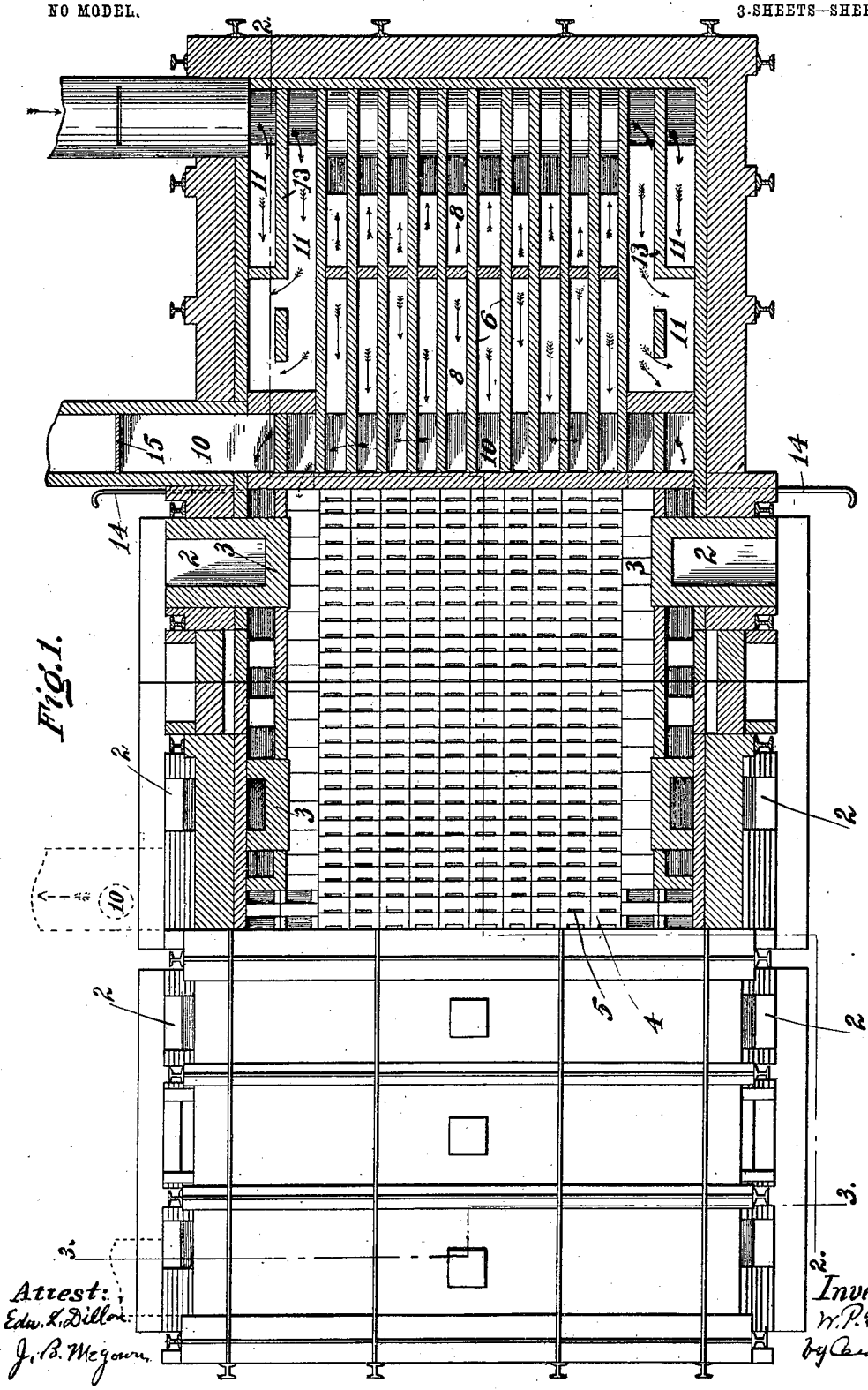
Figure 2:
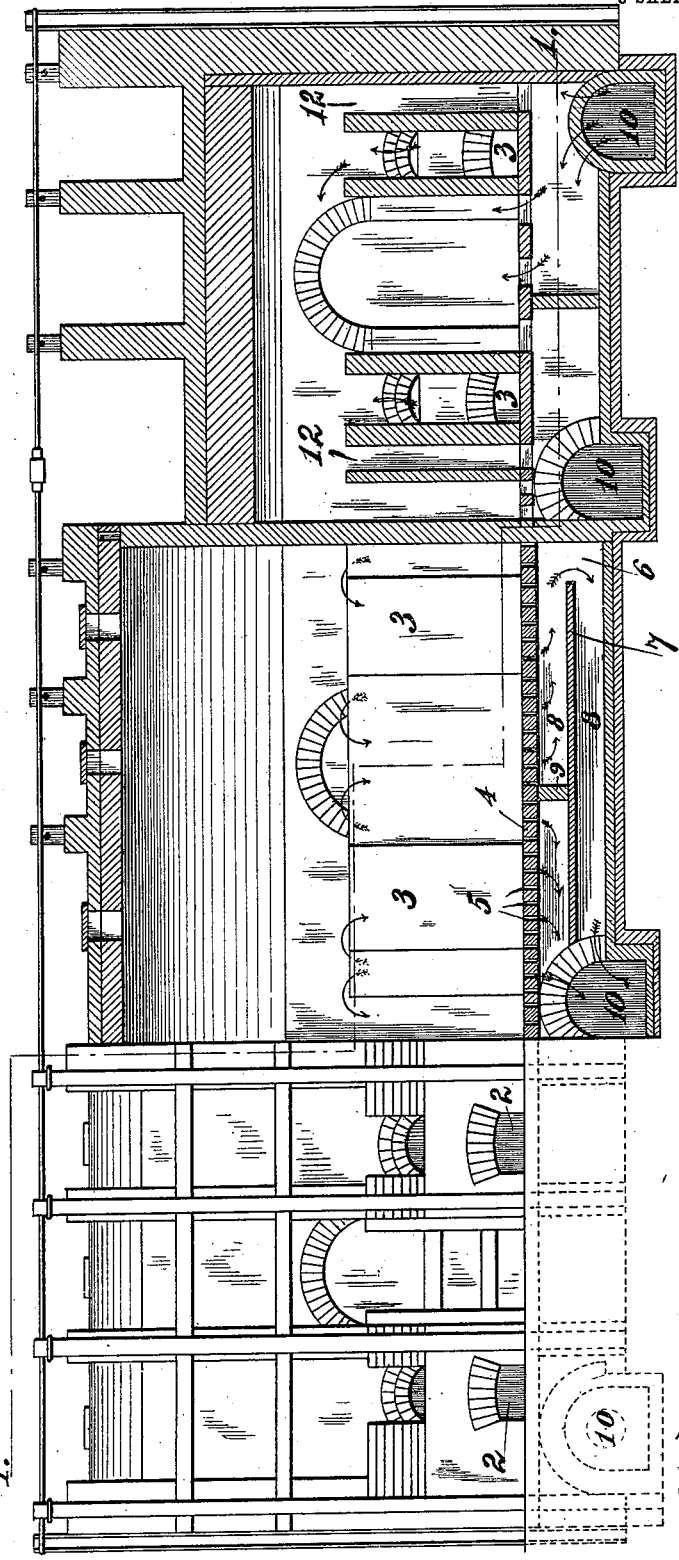
Figure 3:
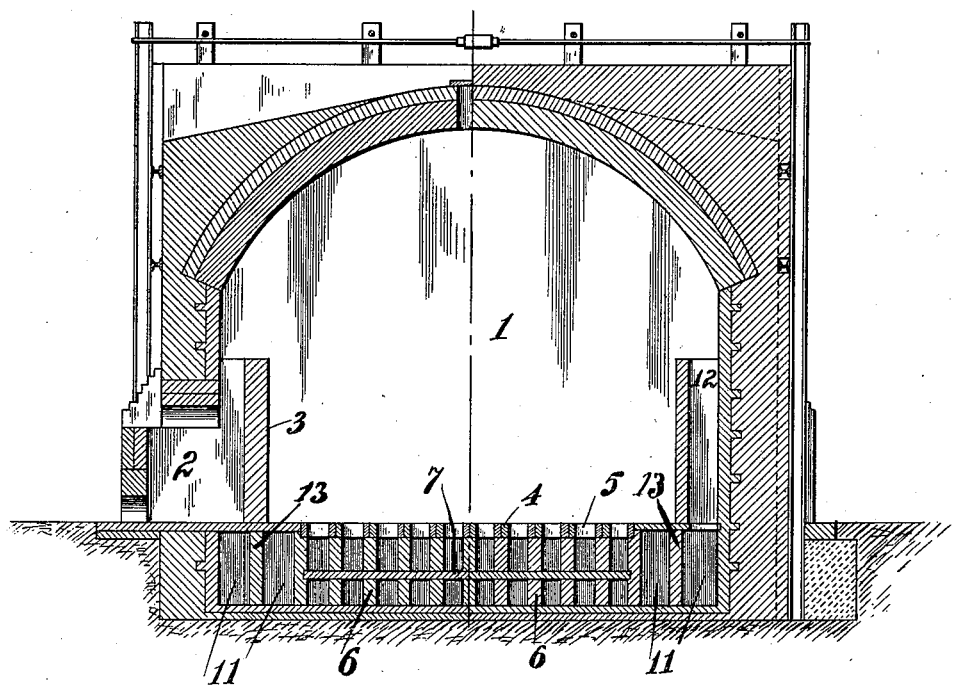
Figure 4:
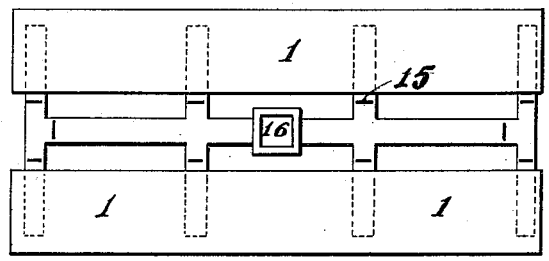

In the accompanying drawings, wherein like symbols refer to like parts wherever they occur, Figure 1 is a horizontal view, partly in plan and partly in section, on the three planes designated by the broken line 1 1 of Fig. 2. Fig. 2 is a vertical view, partly in elevation and partly in section, along the broken line 2 2 of Fig. 1. Fig. 3 is a vertical cross-section of a kiln on the planes indicated by the broken line 3 3 of Fig. 1, and Fig. 4 is a diagrammatic plan view of a continuous kiln.

My continuous kiln comprises several chambers 1, each provided with its own furnaces 2, arranged, preferably, on opposite sides of the chamber, and each furnace is provided with a flash-wall 3, extending from the floor upwardly inside of the chamber, so as to form a bag for the kiln. The main floor 4 of each kiln-chamber has perforations 5 therethrough and is formed, preferably, of tile having depressed spaces in their edges. The perforated tile floor is supported by a series of separate ribs or walls 6, extending lengthwise of the kiln, and the spaces thus formed below the kiln are divided by a horizontal partition 7 into an upper and a lower set of floor-flues 8. The floor-flues of the upper set are divided by a partition-wall 9, extending transversely across the kiln-chamber from flash-wall to flash-wall near the middle of the chamber. Extending transversely across each kiln-chamber at one end thereof and below the floor is a main outlet-flue 10, into which all of the floor-flues 8 above described communicate. For this purpose the horizontal partition 7 does not extend to the wall opposite the main outlet-flue, but is arranged to leave a space next to said wall, whereby the upper set of floor-flues 8 may communicate with those below. Underneath the floor of each chamber are waste-heat flues 11, extending longitudinally along the sides on which the furnaces are located. Extending upwardly from these waste-heat flues 11 are a series of vertical flues 12, arranged along the sides of the chamber close to the bags of the furnaces. In order to secure a better distribution of the products of combustion, these waste-heat flues are divided by a partition-wall 13 into two portions, which communicate with the vertical flues 12 near the respective ends of the chamber. The waste-heat flues 11 of each chamber communicate with the main outlet-flue 10 of the adjacent chamber through openings provided for the purpose, said openings being provided with suitable dampers 14 for regulating said openings independently of each other. The main outlet-flues also are provided with dampers 15 for controlling the draft therein or directing it into the adjacent waste-heat flues.

The operation of my device is as follows: The products of combustion from the furnaces 2 pass up the bags thereof into the kiln-chamber 1 and thence are deflected by the arched or domed roof downwardly through the pile of brick and pass outwardly through the perforations 5 in the floor 4 into the channels or flues 8, located beneath the floor, but above the horizontal partition 7 thereunder. The course of the draft through these channels or flues 8 is longitudinally of the kiln-chamber. A part of such products passes toward one end of the kiln-chamber and the other part passes toward the opposite end of the kiln-chamber, according as they pass through the floor 4 upon one side or the other of the partition-wall 9 of the channels or flues 8. One part of the products of combustion passes directly from the flues 8 into the main outlet-flue 10. The other part passes around the end of the horizontal partition 7 and thence back under said partition into the said main outlet-flue 10. From this flue 10 the products of combustion pass directly to the smoke-stack 16, or when the damper 15 is closed and the damper or dampers 14 are opened the products of combustion pass into the waste-heat flue 11 of another chamber.

From this waste-heat flue 11 of the second chamber the products of combustion pass upwardly through the bags or wall-flues 12 of said chamber, and their course through said chamber to the outlet-flue 10 is the same as hereinbefore described for the course of the products of combustion direct from the furnace.

It will be noted that the course of the draft from the furnace is upwardly through the bag and thence downwardly through the brick, so that the advantage of a downdraft-furnace is secured. It will be further noted that the direction of the draft through the floor-flues is lengthwise of the kiln—that is, parallel with the side of the chamber upon which the furnace is located—so that there is a great uniformity in the distribution of the products of combustion throughout the floor-space, and that the division of such floor-flues near the middle line of the chamber increases such uniformity by forcing the draft in opposite directions lengthwise from the middle of the kiln. The dampers in the different flues give the operator full control over the comparative distribution of the drafts, and the connection of the waste-heat flue of the chamber direct to the initial bags or wall-flues especially provided therefor makes the distribution and control of the waste heat the same as the distribution and control of the original products of combustion.

Obviously the construction hereinbefore described may be changed without departing from my invention. For instance, the main floor may be solid instead of perforated, in which case the upper set of flues or channels may be formed with the green brick.

What I claim is—

1. A continuous kiln comprising a plurality of chambers, each chamber having furnaces and an outlet-flue and a waste-heat flue, the waste-heat flue of each chamber communicating with bags arranged vertically alongside of the furnace-bags of the same chamber.

2. A continuous kiln comprising a plurality of chambers, each chamber having furnaces and an outlet-flue and a waste-heat flue, the outlet-flue of one chamber being arranged to communicate with the waste-heat flue of another chamber, and said waste-heat flue being arranged below the floor along the furnace side of the chamber and communicating with bags arranged alongside of the furnace-bags, substantially as described.

3. A continuous kiln comprising a plurality of chambers, each chamber having furnaces on the longitudinal sides thereof, a main outlet-flue arranged transversely below the floor of said chamber and waste-heat flues arranged longitudinally below said floor near the sides thereof, the waste-heat flues of one chamber communicating with the outlet-flue of another chamber and opening into bags alongside of the corresponding furnace-bags of its own chamber, substantially as described.

4. A continuous kiln comprising a plurality of chambers, each chamber having a furnace on one side thereof and a main outlet-flue arranged below the floor of said chamber along the side next to said first-mentioned side, and a waste-heat flue arranged below said floor along said first-mentioned side, the waste-heat flue of one chamber communicating with the outlet-flue of another chamber and opening into bags alongside of the furnace-bag of its own chamber, substantially as described.

5. A continuous kiln comprising a plurality of chambers, each chamber having a furnace on one side thereof, and a perforated floor having flues parallel with said side and communicating with a main outlet-flue arranged below the floor of said chamber along the side next to said first-mentioned side, and a waste-heat flue arranged below said floor along said first-mentioned side, the waste-heat flue of one chamber communicating with the outlet-flue of another chamber and opening into bags alongside of the furnace-bag of its own chamber, substantially as described.

6. A continuous kiln comprising a plurality of chambers, each chamber having a furnace on one side thereof, and a perforated floor having below it two sets of flues arranged one under the other and parallel with the furnace side of said chamber, the flues of the upper set communicating at one end with the flues of the lower set and being divided by a transverse partition and both the upper and the lower flues communicating at the other end with a main outlet-flue arranged below the floor of said chamber, and a waste-heat flue arranged below said floor along said first-mentioned side, the waste-heat flue of one chamber communicating with the outlet-flue of another chamber and opening into bags alongside of the furnace-bag of its own chamber, substantially as described.

7. A continuous kiln comprising a plurality of chambers, each chamber having a furnace on one side thereof and a main outlet-flue arranged below the floor of said chamber along the side next to said first-mentioned side, and a waste-heat flue arranged below said floor along said first-mentioned side and having a partition extending longitudinally thereof for about one-half of its length, the waste-heat flue of one chamber communicating with the outlet-flue of another chamber and opening into bags alongside of the furnace-bag of its own chamber, substantially as described.

8. A continuous kiln comprising a plurality of chambers, each chamber having a furnace on one side thereof and a main outlet-flue arranged below the floor of said chamber along the side next to said first-mentioned side, and a waste-heat flue arranged below said floor along said first-mentioned side, the waste-heat flue of one chamber communicating with the outlet-flue of another chamber and opening into bags alongside of the furnace-bag of its own chamber and dampers for controlling the draft.

9. A continuous kiln comprising a plurality of chambers, each chamber having a furnace on one side thereof, and a perforated floor having flues parallel with said side and communicating with a main outlet-flue arranged below the floor of said chamber along the side next to said first-mentioned side, and a waste-heat flue arranged below said floor along said first-mentioned side, the waste-heat flue of one chamber communicating with the outlet-flue of another chamber and opening into bags alongside of the furnace-bag of its own chamber and damper for controlling the draft, substantially as described.

WALTER P. GRATH.

In presence of—
WILLIAM P. CARR,
HENRY A. KERSTING.